United States Patent [19]

Mills

[11] Patent Number: 4,749,315

[45] Date of Patent: Jun. 7, 1988

[54] TOOL FOR CUTTING A HOLE IN A CONSTRUCTION MATERIAL PRECISELY CONCENTRIC TO A REFERENCE APERTURE

[76] Inventor: Scott D. Mills, 7708 West Clarendon Ave., Phoenix, Ariz. 85033

[21] Appl. No.: 10,184

[22] Filed: Feb. 2, 1987

[51] Int. Cl.$^4$ ............................................. B23B 51/04
[52] U.S. Cl. ..................................... 408/209; 408/80; 408/119; 408/204
[58] Field of Search ............... 408/204, 207, 209, 119, 408/80

[56] References Cited

U.S. PATENT DOCUMENTS

| | | | |
|---|---|---|---|
| 2,484,150 | 10/1949 | Brown | 408/204 |
| 2,599,887 | 6/1952 | Besse | 408/119 |
| 3,559,513 | 2/1971 | Hougen | 408/204 |
| 3,884,593 | 5/1975 | Christoffer | 408/80 |
| 4,090,804 | 5/1978 | Haley | 408/204 |
| 4,406,334 | 9/1983 | Baumann et al. | 408/204 |

FOREIGN PATENT DOCUMENTS

| | | | |
|---|---|---|---|
| 152309 | 7/1985 | Japan | 408/80 |
| 1589293 | 5/1981 | United Kingdom | 408/204 |

*Primary Examiner*—John McQuade
*Attorney, Agent, or Firm*—James H. Phillips

[57] ABSTRACT

A tool is provided for drilling a hole in a construction material precisely concentric to a nearly inaccessible reference aperture situated opposite the side of the construction material from which the hole must be cut. A typical application is in cutting a sprinkler head receiving hole concentric with the open end of a downwardly directed drop of a sprinkler distribution system. The tool includes an elongated rod which carries a sliding guide member constrained between a stop positioned at one end of the rod and a compression spring urging the guide member toward the stop. Intermediate the length of the rod, there is provided a hole saw retaining shoulder against which a conventional hole saw of the desired diameter cut to receive a sprinkler head may be affixed with its teeth directed toward the rod first end. In use of the tool, the second end of the rod is secured into the chuck of a drill, and the guide member is inserted through a small, rough access hole and into the open end of the drop to correctly position the tool assembly. The operator may then push the drill upwardly to force the guide member against the compression spring and thereby address the construction material with the teeth of the hole saw which cuts through the construction material to obtain the correctly dimensioned and aligned hole to receive the sprinkler head.

2 Claims, 1 Drawing Sheet

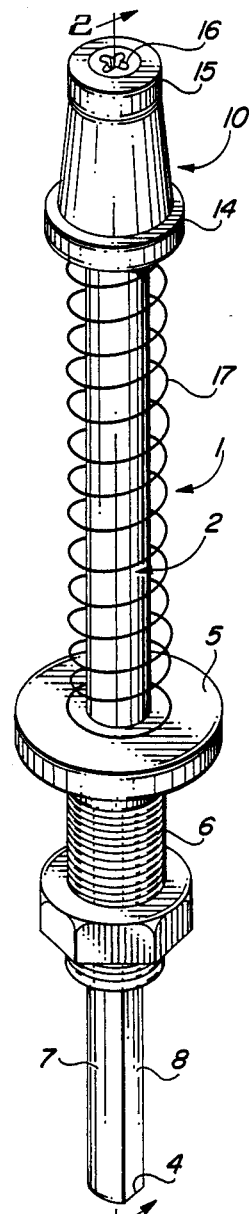
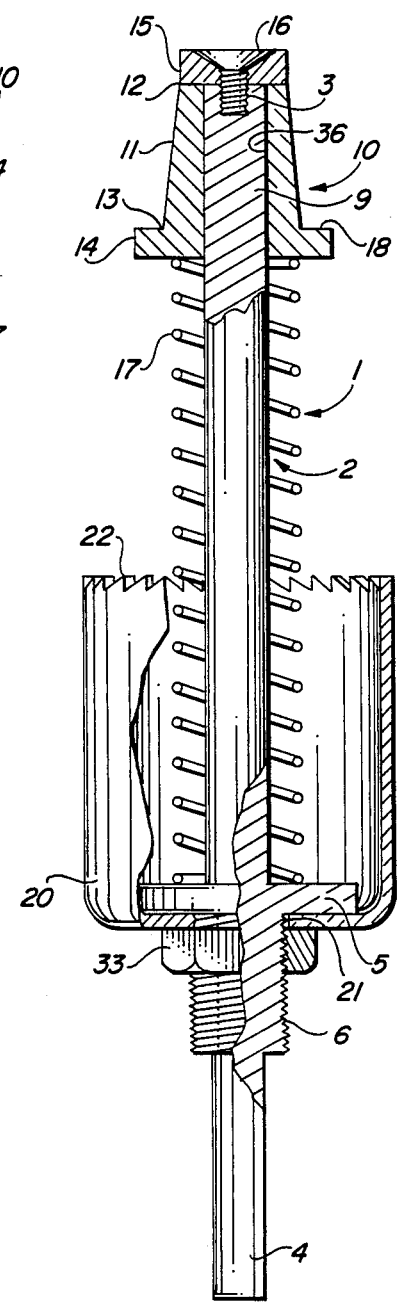
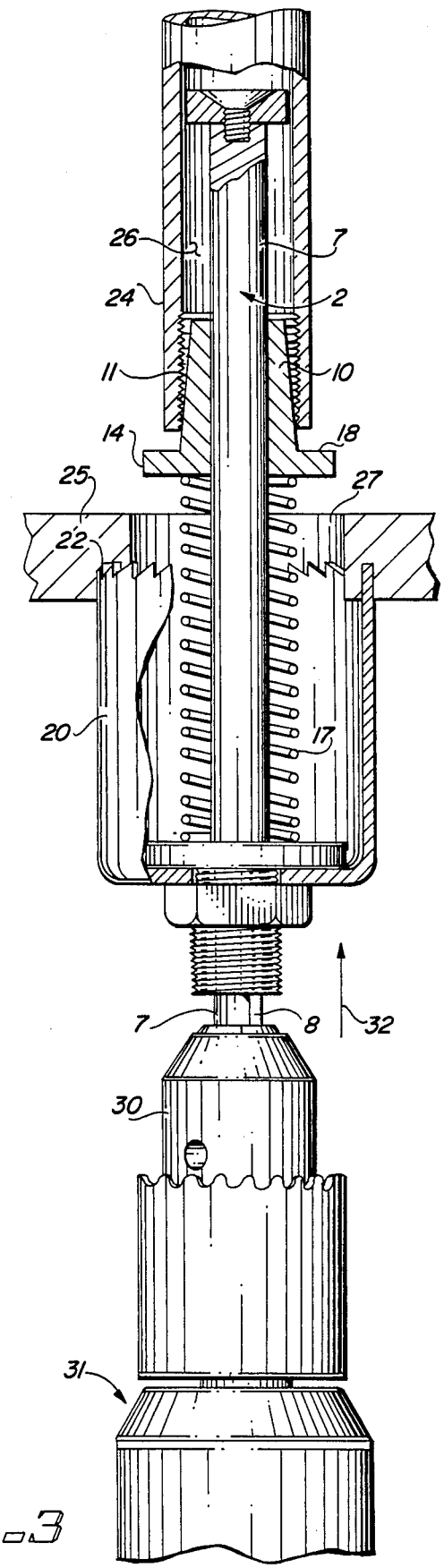
FIG. 1
FIG. 2
FIG. 3

TOOL FOR CUTTING A HOLE IN A CONSTRUCTION MATERIAL PRECISELY CONCENTRIC TO A REFERENCE APERTURE

FIELD OF THE INVENTION

This invention relates to the construction tool arts and, more particularly, to a tool for cutting a circular hole in a construction material precisely concentric to a nearly inaccessible reference aperture.

BACKGROUND OF THE INVENTION

Modern building codes require the widespread installation of sprinkler systems during construction and/or remodeling of both commercial and dwelling buildings. In addition, even when a sprinkler system is not mandated by a building code, their installation is nonetheless widely undertaken to improve the long term safety of working and dwelling places.

During the construction or reconstruction process of a building in which a sprinkler system is to be incorporated, it is standard practice to install the sprinkler system water distribution system at the same time the rest of the water system is installed, but the sprinkler heads are typically not installed until a very late step in the construction process and after the ceiling has been emplaced. During the intermediate period, downwardly directed drops to which an individual sprinkler head is to be subsequently affixed are temporarily capped off at their open ends which are usually physically situated just above the upper ceiling surface. An improvised small hole through the ceiling material is provided to obtain later guidance to the capped off drops from the space below.

Those skilled in the art will appreciate, however, that the subsequent installation of the individual sprinkler heads can be a time consuming and frustrating process because of the near inaccessibility of the drops through the small hole provided and the fact that a larger hole is required in the construction material constituting the ceiling to accommodate the sprinkler head. This larger hole must somehow be cut from below and yet must be as concentric as possible with respect to the drop. Typically, the holes to accommodate the sprinkler heads (which are to be threaded onto the drops) are improvised with a keyhole or similar saw by hand with decidedly unsightly and time consuming results. In some especially difficult installations, it may even be necessary to form the hole for receiving a sprinkler head by laboriously enlarging the roughly provided guide hole with a rasp, again with relatively unsightly results and through a very time consuming, and therefore expensive, process.

My invention is directed to eliminating these problems.

OBJECTS OF THE INVENTION

It is therefore a broad object of my invention to provide a construction tool for drilling a hole through a construction material, which hole is precisely concentric with a nearly inaccessible reference aperture such as the open end of a sprinkler system drop.

It is another object of my invention to provide such a construction tool which is readily adaptable to drilling different diameter holes in the construction material.

It is still another object of my invention to provide such a construction tool by which the hole through the construction material may be cut very quickly without sacrifice in accuracy.

In another aspect, it is an object of my invention to provide such a construction tool which is easy to operate and is relatively simple in construction and therefore reliable and economical to fabricate and long lasting in service.

SUMMARY OF THE INVENTION

Briefly, these and other objects of my invention are achieved with a unique tool including an elongated rod which is circular in cross section along most of its length and which carries a sliding guide member constrained between a stop positioned at one end of the rod and a compression spring urging the guide member toward the stop. Intermediate the length of the rod, there is provided a hole saw retaining shoulder and adjacent threads by which a conventional hole saw of the desired diameter cut to receive a sprinkler head may be affixed (by a nut threaded onto the threaded portion of the rod) with its teeth directed toward the rod first end. In use of the tool, the second end of the rod is secured into the chuck of a drill, and the guide member, which has a conical portion flaring outwardly to a circumferential shoulder, is inserted into the open end of the drop (which functions as the reference aperture) to correctly position the tool assembly with the guide member extending into the drop and its tapered surface or shoulder resting against the periphery of the drop opening. The operator may then push the drill upwardly to force the guide member against the compression spring and thereby address the construction material with the teeth of the hole saw which cuts through the construction material to obtain the hole of correct diameter for receiving the sprinkler head and precisely concentric with the drop of the sprinkler distribution system.

BRIEF DESCRIPTION OF THE DRAWINGS

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 1 is an assembly perspective view of my construction tool before a hole saw element has been incorporated;

FIG. 2 is a partially cut-away, partially cross sectional view of my construction tool illustrating the manner in which a selected hole saw may be incorporated with it; and FIG. 3 illustrates the specific manner in which the tool functions, driven by a conventional drill, to achieve its intended purpose.

DETAILED DESCRIPTION OF THE INVENTION

Attention is now directed simultaneously to FIGS. 1 and 2 in conjunction with the following description by which an understanding of the construction of the subject tool will be obtained. For convenience in explaining the mutual orientation of various elements constituting the tool, the terms "upper" and "lower" and similar terms refer to the tool as oriented in FIGS. 1, 2 and 3.

Thus, the tool 1 includes an elongated rod 2 having a first, upper end 3 and a second, lower end 4. Intermediate the length of the elongated rod 2, there is provided a hole saw retaining shoulder 5 and, immediately below the shoulder 5, a threaded portion 6 of the rod. Below the threaded portion 6 is a reduced diameter portion 7 which extends to the second end 4 of the elongated rod. Optionally, a flat 8 may be provided along the length of the reduced diameter portion 7 for purposes which will become more apparent below.

A guide member 10 is normally positioned at the first, upper end of the elongated bar 2. The guide member 10 has an axial aperture 26 which has a diameter slightly greater than the diameter of a first segment 9 of the elongated rod 2. The first rod segment 9 is circular in cross section; therefore, it will be understood that the guide member 10 fits over the first segment of the elongated rod 2 with sliding and rotating clearance therebetween. The guide member 10 includes a conical portion 11 having an upper (forward) smaller end 12 and a lower (rearward) larger end 13. Joining the conical portion 11 at the rearward end 13 is an outwardly extending circumferential shoulder portion 14.

The guide member 10 is normally retained on the elongated rod 2 by a stop 15 fixed to the first end 3 of the elongated rod and secured in place by any convenient means such as a screw 16. The diameter of the stop 15 is sufficiently larger than the first segment 9 of the elongated rod 2 as to engage the smaller forward end 12 of the conical portion 11 of the guide member 10 and thereby prevent the guide member 10 from being removed from the first end 3 of the elongated rod 2 unless the stop 15 is removed during assembly or disassembly of the tool.

The guide member 10 is normally urged against the stop 15 by a compression spring 17 which encompasses the region of the elongated rod 2 extending between facing surfaces of the circumferential shoulder portion 14 of the guide member 10 and the hole saw retaining shoulder 5. Thus, it will be appreciated that the guide member 10 may be pushed downwardly along the first segment 9 of the elongated rod 2 against the compression spring 17 by suitable pressure upon the upper face 18 of the shoulder portion 14 of the guide member.

Referring particularly to FIG. 2, a conventional hole saw 20 having a central aperture 21 is fitted coaxially with the tool 1 with its peripherally disposed teeth 22 axially directed upwardly toward the first end 3 of the elongated rod 2. The hole saw 20 abuts the hole saw retaining shoulder 5 and is fixed to the shoulder 5 by a retaining nut 33 threaded onto the threaded portion 6 of the elongated rod 2. Thus, a hole saw of any desired outer diameter may be integrated with and coupled to the tool 1 as shown. With the retaining nut 33 tightened against the hole saw 20, the hole saw must rotate with its retaining shoulder 5 and hence with the elongated rod 2.

Consider now the operation of the tool to achieve its intended purpose as shown in FIG. 3. FIG. 3 illustrates a typical installation in which the end of a downwardly directed drop 24 (to which a sprinkler head is to be subsequently attached) is situated just above a piece of construction material 25 (which can be any material used for a ceiling and will be hereinafter simply referred to as the ceiling for clarity in the description). It will be noted that the open end of the drop 24 (any previously supplied temporary cap having been removed) provides a reference aperture with respect to which a precisely concentric hole to accommodate a sprinkler head is to be cut. However, the reference aperture 26 is barely accessible from beneath the ceiling 25 through an access aperture 27 which was roughly provided during the installation of the ceiling 25.

As shown in FIG. 3, the reduced diameter portion 7 of the elongated rod 2 has been inserted into the chuck 30 of a portable drill 31. The flat 8, if provided, obtains a somewhat better grip when used with a Jacobs chuck and also is particularly useful for chucks of the type which employ a set screw or the equivalent to insure a proper and secure coupling between the tool and the rotational motive means.

In use, the guide member 10 is inserted through the small, rough access aperture 27 and into the reference aperture 26 which is simply the open end of the drop 24. As pressure is applied upwardly by the operator of the drill 31, as indicated by the arrow 32, the tapered portion 11 of the guide member 10 (or the upper face 18 of the shoulder 14 of the guide member if the reference aperture is sufficiently large) will first seat against the lower lip of the drop 24 with some or all the conical portion 11 of the guide member 10 extending into the reference aperture 26.

Further pressure will cause the compression spring 17 to begin to collapse such that the reduced diameter portion 7 of the elongated rod 2 slides through the inside of the guide member 10 and further upwardly into the drop 24. When the teeth 22 of the hole saw 20 engage the ceiling 25, the hole saw commences to cut into the ceiling 25 upon actuation of the drill 31 to rotate the hole saw/elongated rod assembly. Continued upward pressure will result in the hole saw 20 cutting completely through the ceiling 25 to thereby provide the desired perfectly round hole in the ceiling 25 which is also precisely concentric with the reference aperture 26 and hence with the drop 24. During the cutting process, the guide member 10 may or may not rotate depending upon the various frictional factors in a given application. Upon removal of the tool by simply lowering it, the sprinkler head, along with any necessary adapters (such as a reducing nipple) may be threaded onto the drop 24, and the installation will have been quickly completed with a superior appearance.

The dimensions of the tool components are adaptable to the corresponding dimensions of the sprinkler system components. By way of typical example, the drop 24 may have a nominal three-quarter inch (typically slightly less depending upon the cut of the threads) inside diameter. Thus, the diameter of the rearward end 13 of the conical portion 11 of the guide member 10 may be three-quarters inch or slightly less, that of the forward end 12 of the conical portion about five-eighths inch and that of the shoulder 14 about one inch. It has been found that a pair of hole saws with respective diameters of one and three-quarters inch and two and one-quarters inch will handle most installations. If the reduced diameter portion 7 of the elongated rod 2 is about one-quarter inch, the tool can be readily driven by any common portable drill including cordless models to which the tool is especially well adapted.

While the subject tool is particularly useful in solving the problem of installing sprinkler heads when there is limited access to the system drops, it will be appreciated by those skilled in the art that it is readily adaptable to similar tasks in which the guide member 10 (or a specially shaped substitute therefore) may be engaged with a nearly inaccessible reference element to guide the subsequent cutting of a hole with the hole saw in a position precisely defined by the position of the reference element.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:

1. A tool for sawing a circular hole in a construction material from a first side thereof, which circular hole is positioned precisely concentric with respect to a smaller reference aperture disposed proximate the construction material, said tool comprising:
   (A) an elongated rod having:
      1. a first end;
      2. a second end; and
      3. a circular cross section along at least a first segment of its length, said first segment including said first end;
   (B) a guide member having:
      1. a periphery including:
         a. a conical portion having:
            i. forward smaller end;
            ii. a rearward larger end; and
            iii. a tapered region intermediate said forward smaller end and said rearward larger end; and
         b. an outwardly extending circumferential shoulder portion adjacent said conical portion larger end; and
      2. an axial aperture, said axial aperture having a diameter slightly greater than the diameter of said first segment of said elongated rod to provide sliding and rotating clearance therealong; and
      3. said guide member being situated on said elongated rod for selective axial translation along said first segment thereof;
   (C) stop means positioned at said first end of said elongated rod to constrain said guide member from removal from said elongated rod at said first end;
   (D) a hole saw retaining shoulder situated intermediate the length of said elongated rod;
   (E) a compression spring encompassing the region of said elongated rod between facing surfaces of said circumferential shoulder portion of said guide member and said hole saw retaining shoulder, said compression spring normally urging said guide member against said stop means; and
   (F) a hole saw, said hole saw:
      1. having a central aperture and a periphery with axially directed teeth;
      2. being disposed coaxially on said elongated rod with its teeth directed toward said first end thereof; and
      3. abutting said hole saw retaining shoulder and adapted to rotate therewith;
   whereby said second end of said elongated rod may be secured in the chuck of a drill, said guide member inserted into the reference aperture and the drill urged against said compression spring to collapse the distance between said circumferential shoulder portion of said guide member and said hole saw retaining shoulder until the teeth of said hole saw engage and saw through the construction material.

2. The tool of claim 1 which further includes saw coupling means for removeably affixing said hole saw against said saw retaining shoulder, said saw coupling means comprising:
   (A) a threaded portion along the length of said rod between said second end and said hole saw retaining shoulder; and
   (B) a retaining nut;
   whereby said hole saw may be introduced over said second end of said elongated rod and brought to bear against said hole saw retaining shoulder and said retaining nut may thereafter be engaged with said threaded portion and tightened against said hole saw to secure said hole saw against said hole saw retaining shoulder.

* * * * *